(12) United States Patent
Zhao et al.

(10) Patent No.: US 12,160,487 B2
(45) Date of Patent: Dec. 3, 2024

(54) METHOD, APPARATUS, AND DEVICE FOR SUBSCRIBING RESOURCES IN FIELD OF INTERNET OF THINGS, AND STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Yanqiu Zhao, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/611,923

(22) PCT Filed: May 21, 2020

(86) PCT No.: PCT/CN2020/091525
§ 371 (c)(1),
(2) Date: Nov. 17, 2021

(87) PCT Pub. No.: WO2020/233658
PCT Pub. Date: Nov. 26, 2020

(65) Prior Publication Data
US 2022/0256007 A1 Aug. 11, 2022

(30) Foreign Application Priority Data
May 23, 2019 (CN) .......................... 201910433275.7

(51) Int. Cl.
*G06F 15/16* (2006.01)
*H04L 67/12* (2022.01)
(Continued)

(52) U.S. Cl.
CPC .............. *H04L 67/55* (2022.05); *H04L 67/12* (2013.01); *H04L 67/60* (2022.05)

(58) Field of Classification Search
CPC .......... H04L 67/55; H04L 67/60; H04L 67/12
See application file for complete search history.

(56) References Cited

U.S. PATENT DOCUMENTS

| 8,560,724 B2 | 10/2013 | Shenfield |
| 2005/0170861 A1 | 8/2005 | Niemi et al. |

(Continued)

FOREIGN PATENT DOCUMENTS

| CN | 1663216 A | 8/2005 |
| CN | 101459908 A | 6/2009 |

(Continued)

OTHER PUBLICATIONS

Supplementary European Search Report (EESR) in the corresponding European Patent Application No. 20810267.3, dated Jun. 20, 2023.

(Continued)

*Primary Examiner* — Normin Abedin
(74) *Attorney, Agent, or Firm* — Chiwin Law LLC

(57) ABSTRACT

A method, apparatus, and device used for subscribing resources in the field of the Internet of Things, and a storage medium, the method used for subscribing resources including: a service entity receiving a subscription request of a third entity for a first object; determining a second object associated with the first object; generating at least a subscription for the second object; and sending a subscription response, the subscription response being used to indicate the result of the subscription. The described method may enable subscribed resources to be more plentiful.

18 Claims, 8 Drawing Sheets

(51) Int. Cl.
*H04L 67/55* (2022.01)
*H04L 67/60* (2022.01)

(56) References Cited

U.S. PATENT DOCUMENTS

| | | | |
|---|---|---|---|
| 2008/0021963 A1 | 1/2008 | Jana et al. | |
| 2008/0140709 A1 | 6/2008 | Sundstrom | |
| 2009/0228467 A1 | 9/2009 | Asanuma | |
| 2010/0091965 A1 | 4/2010 | Ma et al. | |
| 2011/0213758 A1 | 9/2011 | Cao et al. | |
| 2014/0359133 A1 | 12/2014 | Tian et al. | |
| 2016/0205217 A1 | 7/2016 | Choi et al. | |
| 2017/0134523 A1* | 5/2017 | Wu | H04L 67/63 |
| 2020/0213244 A1* | 7/2020 | Chang | H04L 67/55 |
| 2020/0280604 A1* | 9/2020 | Lu | H04W 4/70 |
| 2021/0152653 A1 | 5/2021 | Guo et al. | |

FOREIGN PATENT DOCUMENTS

| | | |
|---|---|---|
| CN | 101742475 A | 6/2010 |
| CN | 104602180 A | 5/2015 |
| CN | 105282118 A | 1/2016 |
| CN | 105323743 A | 2/2016 |
| CN | 105580396 A | 5/2016 |
| CN | 106327114 A | 1/2017 |
| CN | 106973118 A | 7/2017 |
| CN | 107819824 A | 3/2018 |
| JP | 2005352688 A | 12/2005 |
| JP | 2019046108 A | 3/2019 |
| WO | 2006134795 A1 | 12/2006 |

OTHER PUBLICATIONS

First Office Action of the corresponding JP2021-569527, dated Apr. 15, 2024.
First Office Action of the corresponding CN201910433275.7, dated May 13, 2024.
First Office Action issued in the corresponding Indian Patent Application No. 202117059423.

* cited by examiner

METHOD, APPARATUS, AND DEVICE FOR SUBSCRIBING RESOURCES IN FIELD OF INTERNET OF THINGS, AND STORAGE MEDIUM

CROSS-REFERENCE TO RELATED APPLICATIONS

This application is a U.S. National Phase Entry of International Application No. PCT/CN2020/091525, filed on May 21, 2020, designating the Chinese Patent Application No. 201910433275.7, filed on May 23, 2019, for all purposes, the entire disclosures of the aforementioned applications are incorporated by reference as part of the disclosure of the present application.

TECHNICAL FIELD

This application relates to a field of resource subscription, and in particular to a method, apparatus, device, and storage medium for subscribing to a resource in the field of Internet of Things.

BACKGROUND

With the development of information technology, especially Internet technology, IoT (Internet of Things) technology for informationization, remote management control, and intelligence has gradually matured. IoT uses communication technologies such as local networks or the Internet to connect sensors, controllers, machines, people, and objects in new ways to form connections between people and things, as well as between things and things. With the rapid development of IoT technology in various application fields, more and more devices are connected to IoT, and various new application fields such as smart home, smart transportation, and smart health have emerged.

With the development of the IoT, more and more application entities are connected to the cloud. Through the continuous digitization of the application entities, the corresponding virtual entities (called digital twins) are formed for the application entities in the cloud. By controlling virtual entities in the cloud, the application may implement operations to the application entities such as obtaining state and issuing commands. In order to access the cloud, the application entities need to access the IoT platform through registration. The IoT platform generates corresponding resources for the application entities. The application may obtain state changes of the application entities by subscribing to the resources corresponding to the application entities.

SUMMARY

The present application provides a method, apparatus, device, and storage medium for subscribing to a resource in the field of Internet of Things.

According to an aspect of the present disclosure, a method for subscribing to a resource is provided. The method includes: receiving, by a service entity, a subscription request for a first object from a third entity; determining a second object associated with the first object; generating a subscription at least to the second object; and sending a subscription response, where the subscription response is used to indicate a result of the subscription.

According to an aspect of the present disclosure, another method for subscribing to a resource is provided. The method includes: sending a subscription request for a first object; and receiving a subscription response to the subscription request, where the first object is associated with a second object, and the subscription response is used to indicate a result of generating a subscription at least to the second object.

According to another aspect of the present disclosure, apparatus for subscribing to a resource is provided. The apparatus includes: a receiving unit, configured to enable a service entity to receive a subscription request for a first object from a third entity; a determining unit, configured to determine a second object associated with the first object; a generating unit, configured to generate a subscription at least to the second object; and a sending unit, configured to send a subscription response, where the subscription response is used to indicate a result of the subscription.

According to another aspect of the present disclosure, a device for subscribing to a resource is provided. The device includes: a memory, configured to store computer-readable instructions; and a processor, configured to execute the computer-readable instructions stored in the memory, where following steps are performed when the processor executes the computer-readable instructions: receiving, by a service entity, a subscription request for a first object from a third entity; determining a second object associated with the first object; generating a subscription at least to the second object; and sending a subscription response, where the subscription response is used to indicate a result of the subscription.

According to yet another aspect of the present disclosure, a computer readable storage medium is provided. The medium stores computer-readable instructions thereon, which, when performed by a computer, cause the computer to perform a method for subscribing to a resource, the method including: receiving, by a service entity, a subscription request for a first object from a third entity; determining a second object associated with the first object; generating a subscription at least to the second object; and sending a subscription response, where the subscription response is used to indicate a result of the subscription.

In the above aspects of the present disclosure, by sending a subscription response to the third entity based on the state of the second object, where the subscription response is used to indicate the result of generating the subscription to the second object, the subscription to the second object associated with the first object may be realized, therefore, the subscribed resources are enriched. In addition, different subscription modes may be created according to the state of the second object, so as to realize the diversification of modes in different situations.

BRIEF DESCRIPTION OF THE DRAWINGS

Through a more detailed description of embodiments of the present disclosure in combination with drawings, the above and other purposes, features and advantages of the present disclosure will become more obvious. The drawings are used to provide a further understanding of the embodiments of the present disclosure and form a part of the description. The drawings are used together with the embodiments of the present disclosure to explain the present disclosure and do not constitute a limitation on the present disclosure. In the drawings, the same reference numerals generally represent the same components or steps.

DETAILED DESCRIPTION OF THE EMBODIMENTS

Figure 1:
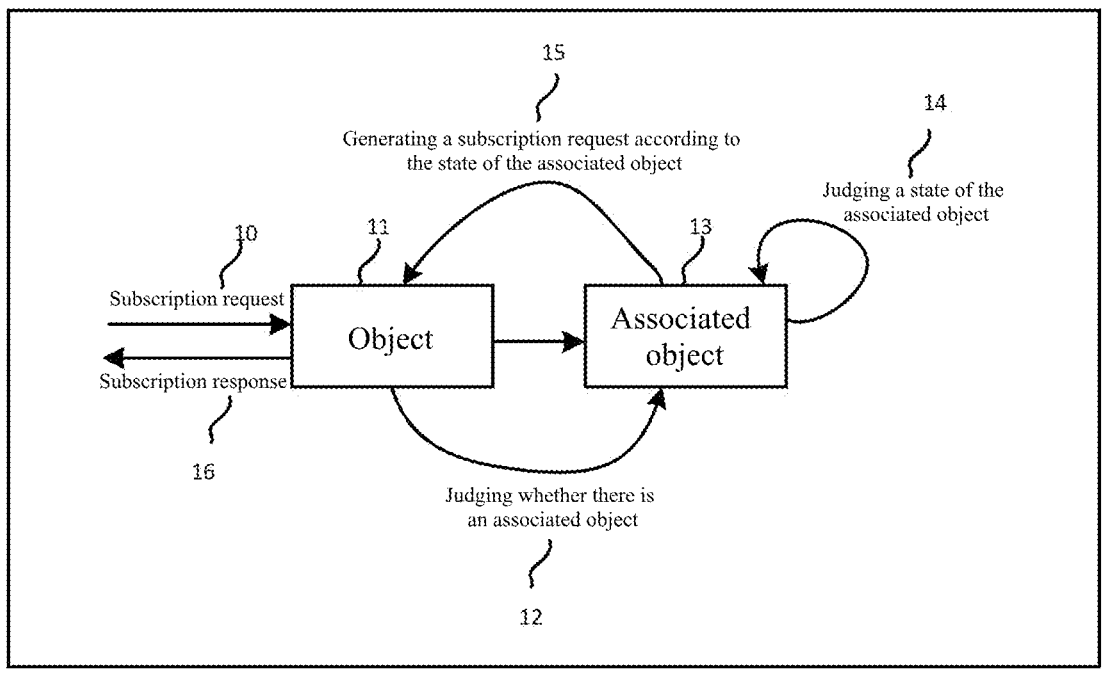
FIG. 1 is a schematic diagram of a system for implementing subscribing to a resource of embodiments of the present disclosure.

Hereinafter, technical solutions in embodiments of the present disclosure will be described clearly and comprehensively in combination with the drawings thereof. Obviously, these described embodiments are only parts of the embodiments of the present disclosure, rather than all of the embodiments thereof, all the other embodiments obtained by those of ordinary skill in the art based on the embodiments of the present disclosure without paying creative efforts fall into the protection scope of the present disclosure.

The "first", "second" and similar words used in the present disclosure do not indicate any order, quantity or importance, but are only used to distinguish different components. Likewise, words such as "include", "comprise" and the like refer to that elements or items appearing before the word cover the elements or items listed thereinafter or their equivalents, without excluding other elements or items. Words such as "connected", "connecting" and the like are not restricted to physical or mechanical connections, but may include electrical connections, regardless of direct or indirect connections.

In some implementations, a sender (for example, serving as a subscriber) usually sends a request for creating a subscription resource to a receiver (for example, a service entity), and then the receiver creates a subscription under the subscribed resource, and then the receiver sends a subscription response to a notified party. Since the receiver only subscribes to a target resource specified in the sender's subscription request, resulting that a content of the subscription cannot meet needs of applications.

The flow chart is used in the present disclosure to illustrate steps of a method according to the embodiments of the present application. It should be understood that preceding or subsequent steps may not be necessarily performed precisely in order. Instead, respective steps may be processed in reverse order or simultaneously. At the same time, other operations may also be added to these processes, or one or several steps may be removed from these processes.

IoT may serve as an extension of the Internet, which includes the Internet and all the resources on the Internet, and is compatible with all Internet applications. With the applications of IoT technology in various fields, various new application fields such as smart home, smart transportation, and smart health have emerged.

With a development of the IoT technology, more and more terminal devices are connected to an IoT platform, such as smoke alarms, fire alarms, manhole cover movement sensors and other devices. The IoT platform may be implemented, for example, as a common service entity (CSE), and the terminal devices may be connected to the common service entity by sending registration information to the common service entity, and the common service entity manages the terminal devices connected thereto. The terminal devices may be indicated as application entities (AE), and the application entities connected to the common service entity may perform operations such as data transmission, information interaction with the common service entity. It should be noted that the application entities described herein may be the terminal devices in IoT, or software modules or the like in the terminal devices in IoT, or may be software modules in a server in IoT. A terminal device may have one or more AE, at the same time, it may have zero or one CSE. A server may have one or more AE, at the same time, it may have one CSE. After the terminal device register to the server successfully, the server may create a digital twin for the terminal device. The digital twin includes one or more objects representing the physical device in the server (including edge server or cloud server). An object may be used to represent part of or whole of the application entity or common service entities, for example, an object may be used to represent an application or functionality in the application entity or common service entities. The object may be a resource or an attribute who belongs to application entity or common service entities.

The application entities (AE) and the common service entities (CSE) are logical entities. Physical equipment includes logical entities. Relatively simple terminal equipment may only include application entities, and relatively complex terminal equipment may include application entities and common service entities. For example, the server includes at least the common service entities, and may also include the application entities at the same time. The difference between the common service entities included in the terminal device and the common service entities included in the server lies in the difference in functions. Generally, the common service entities of the server includes more functions, such as device management functions and the like. The common service entities described herein may be service software modules in the terminal devices in IoT, or may also be service software modules in the servers in IoT.

In the present disclosure, a subscription to an application entity associated with an expected application entity may be generated according to an subscription request of the subscriber for the expected application entity, and different subscription modes may be generated according to a state of the application entity associated with the expected application entity, so as to realize a diversification of the subscription.

First, a system for implementing subscribing to a resource of the embodiments of the present disclosure will be described with reference to FIG. 1.

As shown in FIG. 1, in a system of IoT, the initiator of the subscription request may be the application entity or the common service entity. Taking the application entity as an example, the application entity sends a subscription request 10 for the object 11 to the common service entity. For example, after receiving the subscription request for the object 11, the common service entity may directly create a subscription to the object 11, and send a subscription response 16 indicating the generation of the subscription to the object 11 to the application entity. In some implementations, as shown in FIG. 1, the common service entity may determine whether there is an associated object 13 after receiving the subscription request for the object 11. If there is the associated object 13, the common service entity may generate the subscription to the associated object 13 or to both the object 11 and the associated object 13 by judging a state of the associated object 13, and then, the common service entity sends a subscription response 16 to the application entity, where the subscription response 16 indicates the generation of the subscription to the associated object 13 or to both the object 11 and the associated object 13. Through the above method, the subscription to the associated object associated with the object may be realized, so that the subscription resources are more abundant. For example, when the initiator of the subscription request does not know the associated object or does not have an authority to know the associated object, the initiator of the subscription request may realize the subscription to the associated object through the system described in FIG. 1, which enriches the subscripted resources and improves an efficiency of the system. It should be noted that a second object may be one or more entities.

In the following, a method 100 for subscribing to a resource in a field of IoT according to the embodiments of the present disclosure is described with reference to FIG. 2. This method may be performed by the common service entity (for example, a retail server). The method for subscribing to the resource in IoT includes the following steps S101 to S104.

In step S101, a serving entity receives a subscription request for a first object from a third entity.

In step S102, a second object associated with the first object is determined.

In step S103, a subscription to at least the second object is generated.

In step S104, a subscription response is sent, where the subscription response is used to indicate a result of the subscription.

Figure 2:
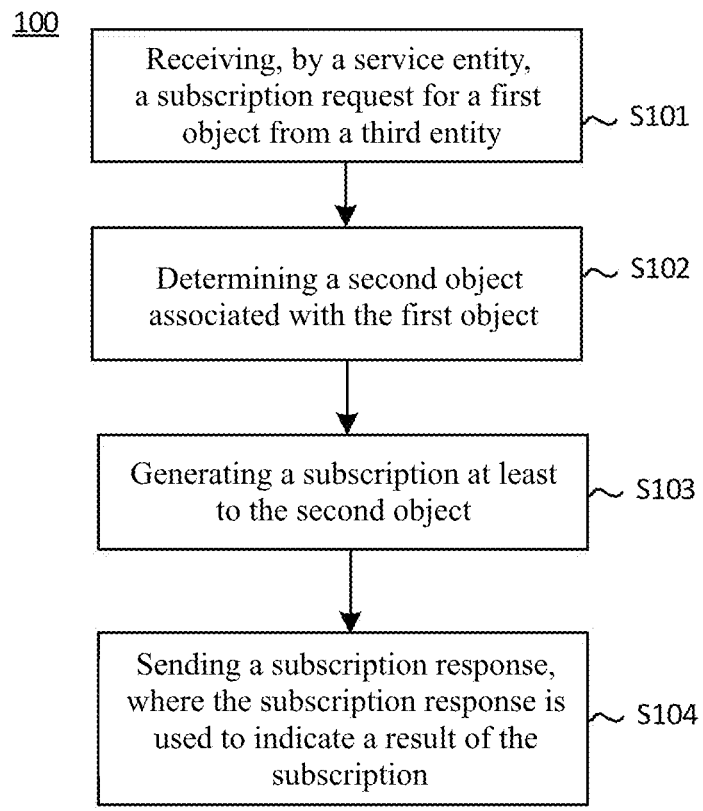
FIG. 2 is a flow chart of a method for subscribing to a resource according to embodiments of the present disclosure.

As shown in FIG. 2, in step S101, the serving entity receives the subscription request for the first object from the third entity. For example, the service entity may receive a request from the third entity, the request carries related information, and the related information contains the subscription request for the first object.

For example, the first object (AE1) may be a virtual electronic label managed by the service entity and used to indicate information of corresponding commodities. The virtual electronic label is a digital twin of a physical electronic label, including attributes such as electronic label identification (ID) and commodity identification (ID), and is associated with (or bound to) the corresponding commodity through the commodity identification (ID). For example, the first object may be a virtual shelf electronic label, which is associated with the corresponding commodity on the shelf through the commodity identification; and the third entity (AE3) may be a shelf management application or a virtual shopping terminal. For example, in this step, the common service entity receives a subscription request from AE3 (the shelf management application or the shopping terminal) to the shelf electronic label AE1.

Next, in step S102, the second object associated with the first object is determined.

For example, the second object (AE2) may be a virtual electronic label managed by the service entity and used to indicate information of corresponding commodities. For example, the second object may be a virtual inventory electronic label, which is associated with the corresponding commodity in the inventory through the commodity identification. For example, in this step, it may be judged whether the inventory electronic label AE2 is associated with the shelf electronic label AE1.

For example, the common service entity may determine the second object associated with the first object by judging whether the first object and the second object are for the same object. For example, if the first object and the second object are for the same object, it is determined that the second object is associated with the first object; and if the first object and the second object are for different objects, it is determined that the second object is not associated with the first object.

For example, if a category of the commodity associated with the first object is identical with a category of the commodity associated with the second object, it is considered that the first object and the second object are for the same object. As an example, if the commodity associated with the first object is Fuji Apples, and the commodity associated with the second object is Golden Marshal Apples, it may be judged that the two commodities belong to the same category (both belong to apples), that is, it may be considered that the first object and the second object are for the same object. As another example, if the commodity associated with the first object is Fuji Apples, and the commodity associated with the second object is bananas, it may be judged that the two commodities do not belong to the same category, that is, it may be considered that the first object and the second object are for different objects.

For another example, if the commodity associated with the first object and the commodity associated with the second object are exactly the same, the first object and the second object are considered to be for the same object. As an example, if the commodity associated with the first object is Fuji Apples, and the commodity associated with the second object is also Fuji Apples, it may be judged that the two commodities are exactly the same, that is, the first object and the second object may be considered for the same object.

In addition, for example, the second object associated with the first object may be determined by the common service entity by judging whether the first object and the second object belong to the same group, or whether an association attribute of the first object includes the second object, or whether an association attribute of the second object includes the first object. When it is determined that the condition is satisfied, it indicates that the second object and the first object are associated.

For example, different commodities may be divided into different groups according to a predetermined rule, and the service entity may determine the second object associated with the first object by judging whether the first object associated with the corresponding commodity (or bound to the corresponding commodity) and the second object associated with the corresponding commodity (or bound to the corresponding commodity) belong to a same predetermined group. As one example, the apples in the shelf and the bananas in the inventory may be divided into the same group according to the predetermined rule. Then, in a case where the shelf electronic label associated with the apples on the shelf is served as the first object, the service entity may determine the second object associated with the first object (i.e., the inventory electronic label) by determining the entities belonging to the same group as the shelf electronic label associated with the apples on the shelf.

In some embodiments, the common service entity may also determine the second object associated with the first object based on an association rule included in the subscription request.

For example, the association rule may be included in the subscription request which is sent from the shopping terminal received by the common service entity. For example, the association rule may indicate that an object bound to a commodity with a same category as the commodity associated with the first object is served as the second object. Then, the common service entity may determine the second object associated with the first object according to the association rule.

In some implementations, an association strength between the first object and the second object is calculated, and when the association strength is greater than a preset threshold, it is determined that the second object is associated with the first object.

For example, the association strength between the first object and the second object is determined by judging the category difference between the commodity corresponding to the first object and the commodity corresponding to the second object. When the category difference for the commodities is small, it indicates that the association strength is strong, and when the category difference is large, it indicates that the association strength is low.

It should be noted that the second object may be one or more entities.

After the second object associated with the first object is determined, next, in step S103, the subscription to the second object is generated. Here, generating the subscription to the second object includes one of two methods: (1) creating a subscription resource for the second object; (2) creating subscription resources to the first object and the second object.

Figure 3:
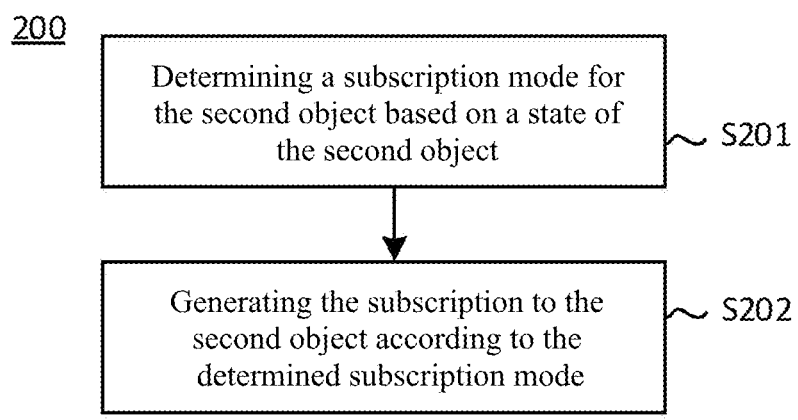
FIG. 3 is a flow chart of a method for generating a subscription to a second object according to embodiments of the present disclosure.
Figure 4:
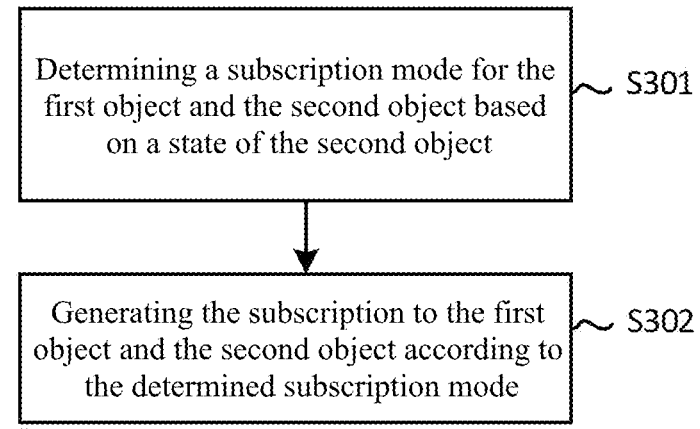
FIG. 4 is a flow chart of another method for generating a subscription to a second object according to embodiments of the present disclosure.

FIG. 3 is a flowchart of a method 200 for generating the subscription to the second object according to the embodiments of the present disclosure, and FIG. 4 is a flowchart of another method 200 for generating the subscription to the second object according to the embodiments of the present disclosure. In the following, generating the subscription to the second object is described with reference to FIG. 3-FIG. 4.

FIG. 3 shows the flowchart of the method 200 for generating the subscription to the second object according to the embodiments of the present disclosure. As shown in FIG. 3, the subscription to the second object may be generated in the following manner including: determining a subscription mode for the second object based on a state of the second object (S201); and generating the subscription to the second object according to the determined subscription mode (S202).

For example, in a case where the second object is the virtual electronic label in a retail field, the state of the second object may be classified into two states of in-stock and out-of-stock. It should be realized that the state of the second object is not limited to this, and the state of second object may be classified into any appropriate state according to situations, and there is no limitation here.

For example, the subscription mode may include a long-term subscription, a short-term subscription, an additional information subscription, a reservation information subscription, a high-priority subscription, a low-priority subscription, a high-frequency information subscription, and a low-frequency information subscription and so on. One or more of message priority, validity periods of the subscription resources, content of the notification, and the number of notification messages under different subscription modes are different. Different subscription modes may be selected for different situations (for example, the state of the second object), thereby improving the user experience. Next, different subscription modes will be described in detail.

For example, the subscription mode may be divided into the long-term subscription and the short-term subscription according to the validity period of a notification reserved for subscription resources. The validity period of the notification for the long-term subscription is longer than that of the short-term subscription. For example, in the case of the long-term subscription mode, a longer validity period of the notification (for example, one month) may be set, and a notification may be sent to the notified party when an event notification rule is satisfied within the validity period. However, for example, in the case of the short-term subscription mode, a shorter validity period of the notification (for example, real-time delivery) may be set, and a notification may be sent to the notified party when the event notification rule is satisfied within the validity period.

For example, the subscription mode may be divided into the additional information subscription and the reservation information subscription according to the content of the notification for the subscription resource. For example, in the case of the reservation information subscription mode, when an event notification rule is satisfied for certain commodity, detailed reservation information such as price, material, discount etc. related to the commodity and for an reservation information request may be sent to the notified party, where the reservation information request may be included in the subscription request. For example, in the case of the additional information subscription mode, when the event notification rule is satisfied for a certain commodity, in addition to the detailed reservation information such as price, material, discount etc. related to the commodity and for the reservation information request, additional detailed information such as price, material, discount, etc., related to a commodity that is similar to the commodity may also be sent to the notified party, where the additional detailed information is not included in the subscription request.

For example, the subscription mode may be divided into the high-priority subscription and the low-priority subscription according to a priority of the notification for the subscription resource. For example, compared to the low-priority subscription mode, in the case of the high-priority subscription mode, the notification may be sent first in time, or the notification may be sent multiple times to ensure that the notified party could receive the notification.

For example, the subscription mode may be divided into the high-frequency information subscription and the low-frequency information subscription according to the number of information of the notification for the subscription resource. For example, in the case of the high-frequency information subscription mode, a short minimum notification time interval (for example, 2 hours) may be set. When the event notification rule is satisfied, notifications are sent to the notified party, and a time interval between two consecutive notifications is not shorter than the minimum notification time interval. For example, in the case of the low-frequency information subscription mode, a long minimum notification time interval (for example, 24 hours) may be set. When the event notification rule is satisfied, notifications are sent to the notified party, and a time interval between two consecutive notifications is not shorter than the minimum notification time interval.

Continue to refer to FIG. 3, for example, in step S201, the subscription mode for the second object may be determined according to the state of the second object. The state of the second object may be determined by attributes of the second object. The attributes of the second object include an object attribute (for example, when the second object is a commodity, the object attribute is information about the commodity, including the quantity and size of the commodity), and a circumstance attribute (for example, people, things, substances, sounds, light, etc. around the second object) and the like. By judging the object attribute, changes of the object may be timely adjusted according to changes of object attribute, thereby realizing the diversification of subscription modes, which is conducive to quick adjustments according to circumstance changes, and thus, improving the efficiency. By judging the changes of the circumstance attribute, circumstances of the object may be timely adjust, thereby realizing the diversification of subscription modes, which is conducive to quick adjustments according to circumstance changes, and thus, improving the efficiency.

In one example, the first object is a shelf electronic label, and the second object associated with the first object is an inventory electronic label. Both the first object and the second object are for the same commodity A, the first object includes the shelf quantity of the commodity A, and the second object includes the inventory quantity of the commodity A. In a case where the second object indicates that the inventory quantity of the commodity A is equal to zero, the long-term subscription (for example, the validity period of the notification may be set to one month, and when the event notification rule is satisfied within the validity period, the notification may be sent to the notified party) may be selected. In a case where the second object indicates that the inventory quantity of the commodity A is not equal to zero, the short-term subscription (for example, the validity period of the notification may be set to one week, and when the event notification rule is satisfied, the notification may be sent to the notified party) may be selected.

In another example, for a certain commodity, in a case where the inventory is in-stock, the reservation information subscription (for example, when the event notification rule is satisfied, detailed reservation information such as price, material, discount etc. related to the commodity and for the reservation information request may be sent to the notified party) may be selected; and in a case where the inventory is out-of-stock, the additional information subscription (for example, in addition to detailed reservation information such as price, material, discount etc. related to the commodity and for the reservation information request, additional detailed information such as price, material, discount, etc., related to a commodity that is similar to the commodity may also be sent to the notified party) may be selected.

In one example, a plurality of subscription modes may be used at the same time. The first object is a shelf electronic label, and the second object associated with the first object is an inventory electronic label. Both the first object and the second object are for the same commodity A, the first object includes the shelf quantity of the commodity A, and the second object includes the inventory quantity of the commodity A. In a case where the second object indicates that the inventory quantity of the commodity A is equal to zero, the long-term subscription and the low-frequency subscription (for example, the validity period of the notification may be set to one month, and when the event notification rule is satisfied within the validity period, events may be processed such as caching and integrating, and the processed events may be notified to the notified party) may be selected, and therefore, requirements of the long-term subscription and the low-frequency subscription are satisfied at the same. In a case where the second object indicates that the inventory quantity of the commodity A is not equal to zero, the short-term subscription and the high-frequency subscription (for example, the validity period of the notification may be set to one week, and when the event notification rule is satisfied, the events will not be processed, and the notification may be sent to the notified party directly) may be selected.

Similarly, one or more of the high-priority subscription (the notification is sent first when the event notification rule is satisfied), the low-priority subscription (the notification is sent when the event notification rule is satisfied and there is no event with higher priority to be sent), the high-frequency information subscription (the notification is sent directly without event processing when the event notification rule is satisfied) and the low-frequency information subscription (the notification is sent after the event is processed including event caching, event integration, etc.) may also be selected. It should be understood that the above subscription modes are just examples. For different situations, one of the long-term subscription, the short-term subscription, the additional information subscription, the reservation information subscription, the high priority subscription, the low priority subscription, the high-frequency information subscription, and the low-frequency information subscription, etc. may be selected, and other suitable subscription modes may also be selected, which is not repeated here.

After determining the subscription mode, in step S202, a subscription to the second object is generated according to the determined subscription mode.

FIG. 4 shows a flowchart of another method 300 for generating the subscription to the second object according to the embodiments of the present disclosure. As shown in FIG. 4, the subscription to the second object may be generated in the following manner including: determining the subscription mode for the first object and the second object based on the state of the second object (S301); and generating the subscription to the first object and the second object according to the determined subscription mode (S302). The selection of the subscription mode described in FIG. 4 is similar to the selection of the subscription mode described in FIG. 3 above, and will not be repeated here.

After generating the subscription to the second object, returning to FIG. 1, in step S104, the subscription response is sent, and the subscription response is used to indicate the result of the subscription. For example, the subscription response may be sent to the third entity, or the subscription response may be sent to other entities, where the subscription response is used to indicate the result of the generated subscription.

For example, in the case of creating the subscription resource for the second object, the subscription response is used to indicate the result of creating the subscription resource for the second object. In some implementations, in the case of creating the subscription resources for the first object and the second object, the subscription response is used to indicate the result of creating the subscription resources for the first object and the second object.

After completing the creation of the subscription, next, the event notification is sent to the notified party based on the determined subscription mode in response to that the event notification rule is satisfied, where the event notification rule is included in the subscription request.

Here, the subscription request may include a plurality of notified parties for receiving event notifications related to the subscription request. When the event notification rule of the subscriber is satisfied, the common service entity will send the event notification to all notified parties included in the subscription request. For example, when a manhole cover is moved, a manhole cover movement sensor will sense this change and send update data to the common service entity. The common service entity may determine whether the event notification rule is satisfied based on the update data of the manhole cover movement sensor. For example, when the subscription condition is the movement of the manhole cover, at this time, the common service entity determines that the event notification rule is satisfied, and sends the event notification to all notified parties included in the subscription request for subscribing to the event notification of the movement of the manhole cover, that is, notifies all the notified parties that the manhole cover was moved.

Hereinafter, another method 400 for subscribing to the resource according to the embodiments of the present disclosure will be described with reference to FIG. 5. This method may be executed by the application entity (for example, the aforementioned third entity AE3).

Figure 5:
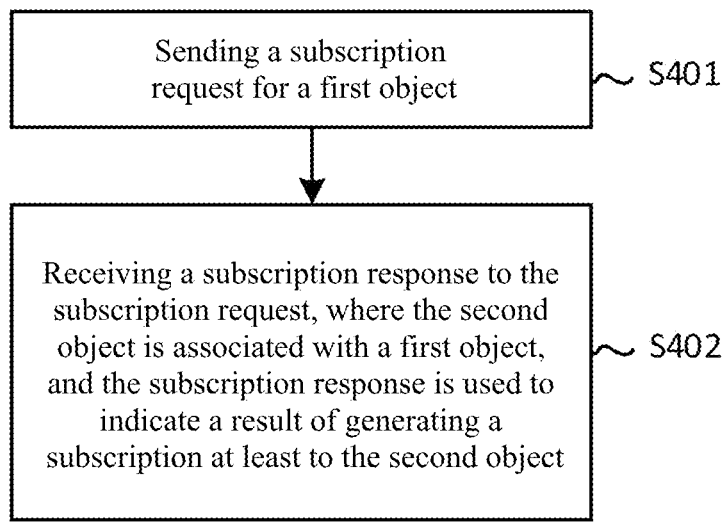
FIG. 5 is a flow chart of another method for subscribing to a resource according to embodiments of the present disclosure.

As shown in FIG. 5, in step S401, the subscription request for the first object is sent. In step S402, the subscription response to the subscription request is received, where the second object is associated with the first object and the subscription response is used to indicate a result of generating the subscription at least to the second object.

For example, the first object (AE1) may be a virtual electronic label managed by the service entity and used to indicate corresponding commodity information. The virtual electronic label is associated with the corresponding commodity (or bound to the corresponding commodity) through the commodity identification (ID). For example, the first object may be a virtual shelf electronic label; the third entity (AE3) may be a shelf management application or a virtual shopping terminal. For example, in this step, AE3 (for example, the shelf management application or the shopping terminal) sends the subscription request for the shelf electronic label AE1 to the common service entity. Then, AE3 receives the subscription response to the subscription request, where the second object is associated with the first object, and the subscription response is used to indicate the result of generating the subscription at least to the second object.

Here, the subscription request may include an association rule for establishing an association relationship between the first application entity and the second application entity. The common service entity may also determine the second object associated with the first object based on the association rule included in the subscription request. For example, the association rule may indicate that an object bound to a commodity of the same category as the commodity associated with the first object is served as the second object.

Here, the subscription response is generated based on the subscription mode determined according to the state of the second application entity for the subscription request.

For example, the subscription response is formed by: determining the subscription mode for the second object based on the state of the second object; and generating the subscription for the second object according to the determined subscription mode, where the subscription response is used to indicate the result of generating the subscription at least to the second object.

In some implementations, the subscription response may also be formed by: determining the subscription mode for both the first object and the second object based on the state of the second object; and generating the subscription for both the first object and the second object according to the determined subscription mode, where the subscription response is used to indicate the result of generating the subscription for both the first object and the second object. The method of generating the subscription response is the same as the method described in FIG. 2, which will not be repeated here.

Next, if the event notification rule is satisfied, the event notification based on the determined subscription mode is received.

Figure 6:
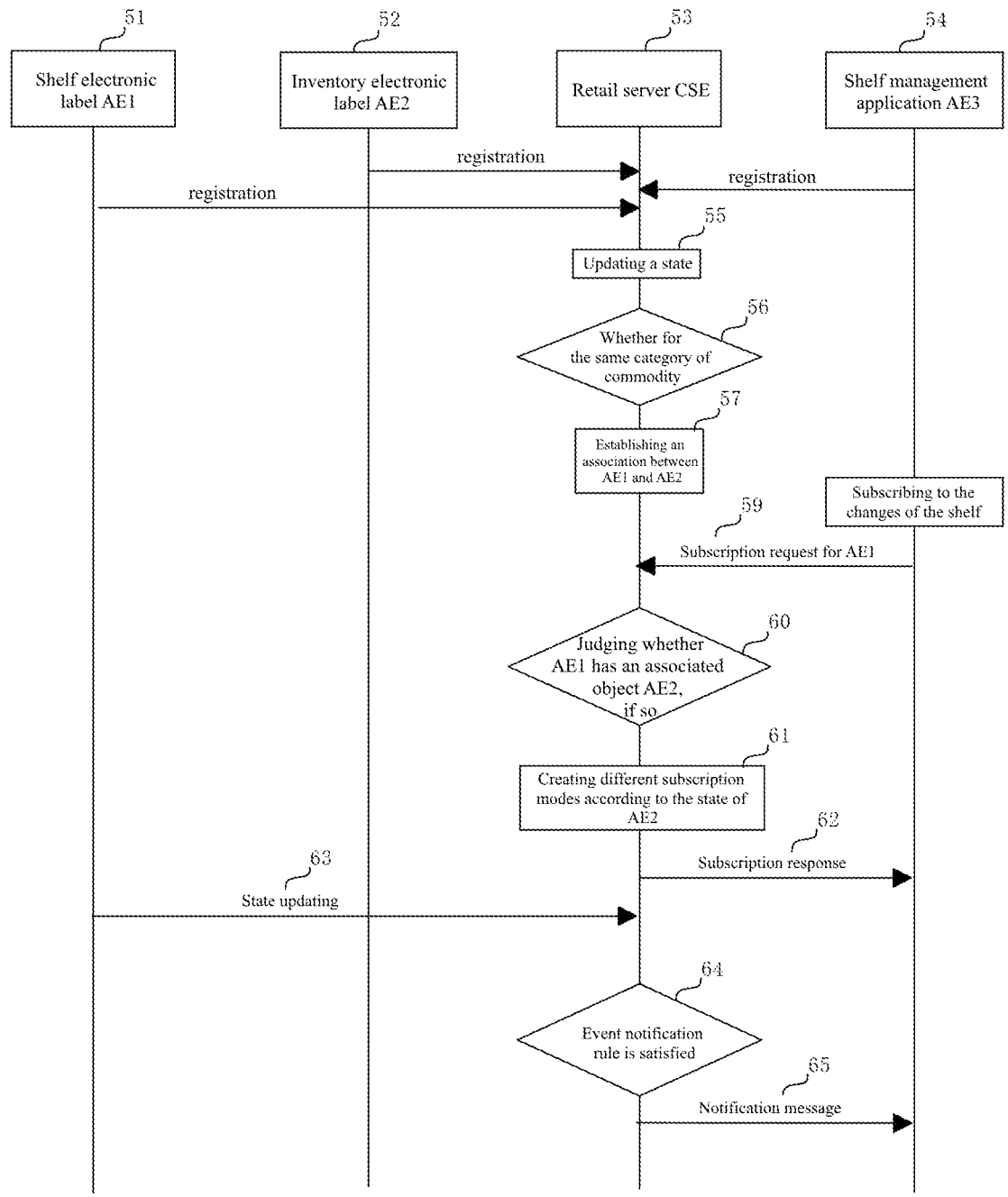
FIG. 6 is a schematic diagram of a method for subscribing to a resource according to a first example of the present disclosure.
Figure 7:
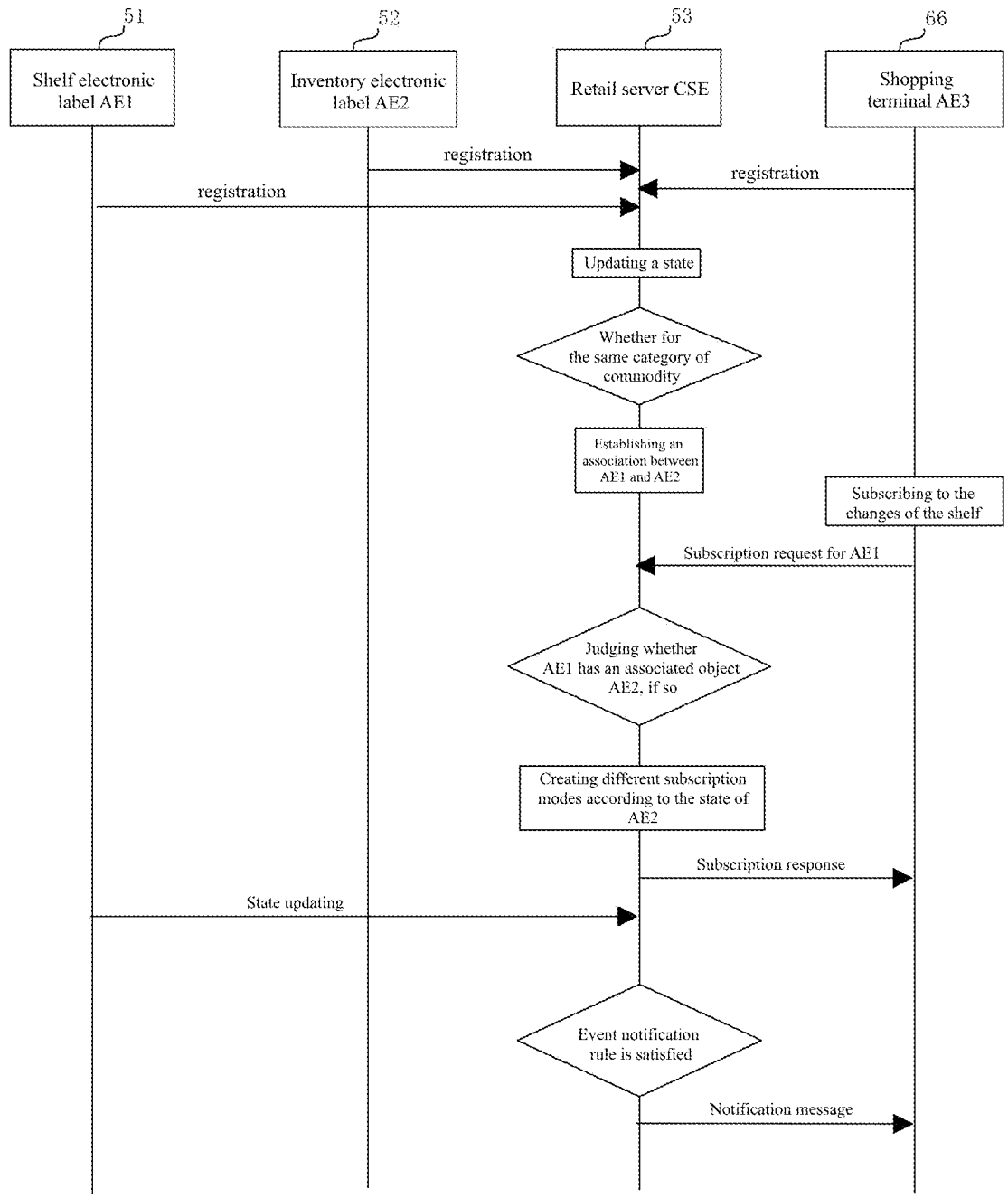
FIG. 7 is a schematic diagram of a method for subscribing to a resource according to a second example of the present disclosure.
Figure 8:
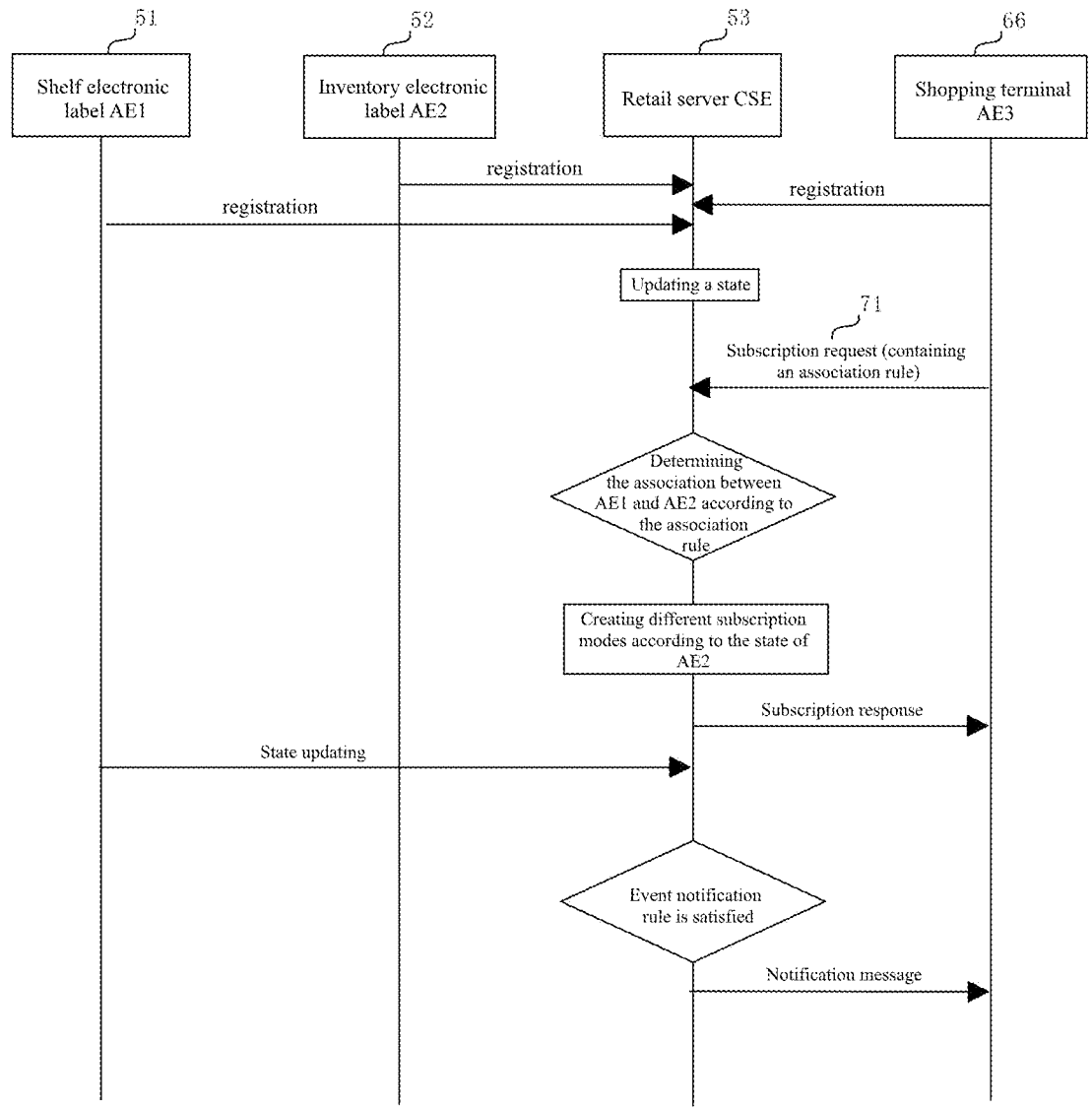
FIG. 8 is a schematic diagram of a method for subscribing to a resource according to a third example of the present disclosure.

Hereinafter, examples for subscribing to the resource according to the embodiments of the present disclosure will be described in detail with reference to FIGS. 6-8. FIG. 6 is a schematic diagram of a method for subscribing to the resource according to a first example of the present disclosure, FIG. 7 is a schematic diagram of a method for subscribing to the resource according to a second example of the present disclosure, and FIG. 8 is a schematic diagram of a method for subscribing to the resource according to a third example of the present disclosure.

The IoT may be composed of the common service entity and a series of application entities. The common service entity may be the retail server, etc. The application entities may be various sensor devices, or user terminals such as mobile phones, or software modules in the device, such as mobile phone applications, etc. The common service entity manages application entities connected thereto and performs operations such as registration, data transmission, task execution, etc.

First Example

FIG. 6 shows the first example for subscribing to the resource according to the present disclosure. In this example, for example, the shelf management application entity of a shopping mall or a supermarket initiates a subscription to adjust the states of the commodities of the shopping mall or the supermarket timely.

As shown in FIG. 6, for example, the retail server CSE 53 (the service entity) receives registration requests from the shelf electronic label AE1 51 (the first object), the inventory electronic label AE2 52 (the second object), and the shelf management application AE3 54 served as the subscriber (the third entity), thereby establishing association relationship with the shelf electronic label AE1 51, the inventory electronic label AE2 52, and the shelf management application AE3 54, and updates their states 55 with the state changes of the shelf electronic label AE1 51, the inventory electronic label AE2 52 and the shelf management application AE3 54. Next, the retail server CSE 53 judges whether the commodities associated with the shelf electronic label AE1 51 and the commodities associated with the inventory electronic label AE2 52 are for the same category of commodity 56, and if so, establishes an association 57 between the shelf electronic label AE1 51 and the inventory electronic label AE2 52.

In the case where the shelf management application AE3 54 sends a subscription request 59 for the shelf electronic label AE1 51 to the retail server CSE 53, the retail server CSE 53 first judges whether the shelf electronic label AE1 51 has an associated object inventory electronic label AE2 52 (the number is 60 in FIG. 6). If the shelf electronic label AE1 51 has the associated object inventory electronic label AE2 52, the retail server CSE 53 may create a subscription resource for the inventory electronic label AE2 52, and send a subscription response 62 to the shelf management application AE3 54 (or other entities), where the subscription response indicates the result of generating the subscription to the inventory electronic label AE2 52. In some implementations, the retail server CSE 53 may also create subscription resources for both the shelf electronic label AE1 51 and the inventory electronic label AE2 52, and send the subscription response 62 to the shelf management application AE3 54 (or other entities), where the subscription response indicates the result of generating the subscription to both the shelf electronic label AE1 51 and the inventory electronic label AE2 52.

Further, in the case where the retail server CSE 53 creates the subscription resource for the inventory electronic label AE2 52, a subscription mode 61 for the inventory electronic label AE2 52 may be determined according to the state of the inventory electronic label AE2 52. For example, as described above, if the inventory electronic label AE2 shows that it is in-stock, the short-term subscription may be created and if the inventory electronic label AE2 shows that it is out-of-stock, the long-term subscription may be created.

In some implementations, in the case where the retail server CSE 53 creates the subscription resources for both the shelf electronic label AE1 51 and the inventory electronic label AE2 52, the subscription mode 61 for both the shelf electronic label AE1 51 and the inventory electronic label AE2 52 may be determined according to the state of the inventory electronic label AE2 52. For example, as described above, if the inventory electronic label AE2 shows that it is in-stock, the short-term subscription may be created, and if the inventory electronic label AE2 shows that it is out-of-stock, the long-term subscription may be created.

Next, the retail server CSE 53 updates the state 63 of the shelf electronic label AE1 51. Subsequently, in the case where the event notification rule 64 is satisfied, an event notification 65 is sent to the notified party (for example, the shelf management application AE3 54) according to the determined subscription mode.

Second Example

FIG. 7 shows the second example for subscribing to the resource according to the present disclosure. In this example, for example, a shopping terminal (for example, a user) initiates a subscription to acquire the states of commodities that is expected to be purchased timely.

As shown in FIG. 7, for example, the retail server CSE 53 (the service entity) receives registration requests from the shelf electronic label AE1 51 (the first object), the inventory electronic label AE2 52 (the second object), and the shopping terminal AE3 66 served as the subscriber (the third entity), thereby establishing association relationship with the shelf electronic label AE1 51, the inventory electronic label AE2 52, and the shopping terminal AE3 66, and updates their states with the state changes of the shelf electronic label AE1 51, the inventory electronic label AE2 52 and the shopping terminal 66. Next, similar to FIG. 6, the retail server CSE 53 judges whether the commodities associated with the shelf electronic label AE1 51 and the commodities associated with the inventory electronic label AE2 52 are for the same category of commodities, and if so, establishes an association 57 between the shelf electronic label AE1 51 and the inventory electronic label AE2 52.

In the case where the shopping terminal AE3 66 sends the subscription request for the shelf electronic label AE1 51 to the retail server CSE 53, the retail server CSE 53 first judges whether the shelf electronic label AE1 51 has an associated object inventory electronic label AE2 52. If the shelf electronic label AE1 51 has the associated object inventory electronic label AE2 52, the retail server CSE 53 may create the subscription resource for the inventory electronic label AE2 52, and send the subscription response to the shopping terminal AE3 66 (or other entities), where the subscription response indicates the result of generating the subscription to the inventory electronic label AE2 52. In some implementations, the retail server CSE 53 may also create the subscription resources for both the shelf electronic label AE1 51 and the inventory electronic label AE2 52, and send the subscription response to the shopping terminal AE3 66 (or other entities), where the subscription response indicates the result of generating the subscription to both the shelf electronic label AE1 51 and the inventory electronic label AE2 52.

Further, in the case where the retail server CSE 53 creates the subscription resource for the inventory electronic label AE2 52, the subscription mode for the inventory electronic label AE2 52 may be determined according to the state of the inventory electronic label AE2 52. For example, if the inventory electronic label AE2 shows that it is in-stock, the short-term subscription may be created, and if the inventory electronic label AE2 shows that it is out-of-stock, the long-term subscription may be created.

In some implementations, in the case where the retail server CSE 53 creates the subscription resources for both the shelf electronic label AE1 51 and the inventory electronic label AE2 52, the subscription mode for both the shelf electronic label AE1 51 and the inventory electronic label AE2 may be determined according to the state of the inventory electronic label AE2 52. For example, as described above, if the inventory electronic label AE2 shows that it is in-stock, the short-term subscription may be created, and if the inventory electronic label AE2 shows that it is out-of-stock, the long-term subscription may be created.

Next, the retail server CSE 53 updates the state 63 of the shelf electronic label AE1 51. Subsequently, in the case where the event notification rule is satisfied, the event notification is sent to the notified party (for example, the shopping terminal AE3 66) according to the determined subscription mode.

Third Example

FIG. 8 shows the third example for subscribing to the resource according to the present disclosure. In this example, for example, an association rule may be included in the subscription request sent by the application entity, and then the common service entity establishes an association between different objects according to the association rule.

As shown in FIG. 8, for example, the retail server CSE 53 (the service entity) receives registration requests from the shelf electronic label AE1 51 (the first object), the inventory electronic label AE2 52 (the second object), and the shopping terminal AE3 66 as a subscriber (the third entity), thereby establishing association relationship with the shelf electronic label AE1 51, the inventory electronic label AE2 52 and the shopping terminal AE3 66, and updates their states with the state changes of the shelf electronic label AE1 51, the inventory electronic label AE2 52 and the shopping terminal 66.

Next, when the shopping terminal AE3 66 sends the subscription request 71 for the shelf electronic label AE1 51 to the retail server CSE 53, the retail server CSE 53 establishes an association between the shelf electronic label AE1 51 and the inventory electronic label according to the association rule contained in the subscription request. Next, the retail server CSE 53 may create the subscription resource for the inventory electronic label AE2 52, and send the subscription response to the shopping terminal AE3 66 (or other entities), where the subscription response indicates the result of generating the subscription to the inventory electronic label AE2 52. In some implementations, the retail server CSE 53 may also create the subscription resource for both the shelf electronic label AE1 51 and the inventory electronic label AE2 52, and send the subscription response to the shopping terminal AE3 66 (or other entities), where the subscription response indicates the result of generating the subscription to both the shelf electronic label AE1 51 and the inventory electronic label AE2 52.

Further, in the case where the retail server CSE 53 creates the subscription resource for the inventory electronic label AE2 52, the subscription mode for the inventory electronic label AE2 52 may be determined according to the state of the inventory electronic label AE2 52. For example, as described above, if the inventory electronic label AE2 shows that it is in-stock, the short-term subscription may be created, and if the inventory electronic label AE2 shows that it is out-of-stock, the long-term subscription may be created.

In some implementations, in the case where the retail server CSE 53 creates the subscription resource for both the shelf electronic label AE1 51 and the inventory electronic label AE2 52, the subscription mode for both the shelf electronic label AE1 51 and the inventory electronic label AE2 may be determined according to the state of the inventory electronic label AE2 52. For example, as described above, if the inventory electronic label AE2 shows that it is in-stock, the short-term subscription may be created, and if the inventory electronic label AE2 shows that it is out-of-stock, the long-term subscription may be created.

Next, the retail server CSE 53 updates the state of the shelf electronic label AE1 51. Subsequently, when the event notification rule is satisfied, the event notification is sent to the notified party (for example, the shopping terminal AE3 66) according to the determined subscription mode.

It can be seen that through the above mentioned methods for subscribing to the resource, the subscription to the second object associated with the first object may be realized, thereby enriching the subscribed resources. In addition, different subscription modes may be created for the states of the second object, so as to achieve diversification of modes in different situations.

Figure 9:
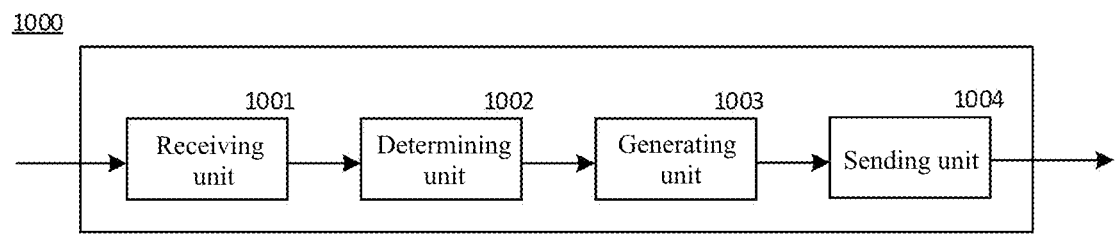
FIG. 9 is a schematic diagram of an apparatus for subscribing to a resource according to embodiments of the present disclosure.

Hereinafter, an apparatus 1000 for subscribing to a resource according to the embodiments of the present disclosure will be described with reference to FIG. 9. FIG. 9 is a schematic diagram of the apparatus 1000 for subscribing to the resource according to the embodiments of the present disclosure. Since the functions of the apparatus for subscribing to the resource in the embodiments is the same as that of the method described above with reference to FIG. 1, detailed description of the same content is omitted here for the sake of simplicity.

As shown in FIG. 9, the apparatus 1000 for subscribing to the resource according to the embodiments of the present disclosure includes a receiving unit 1001, a determining unit 1002, a generating unit 1003, and a sending unit 1004. It should be noted that although the apparatus 1000 for subscribing to the resource is shown as including only 4 units in FIG. 9, this is only illustrative, and the apparatus 1000 for subscribing to the resource may also include one or more other units, which have nothing to do with the inventive concept and are therefore omitted here.

The receiving unit 1001 enables the service entity to receive a subscription request for a first object from a third entity.

For example, the first object (AE1) may be a shelf electronic label; and the third entity (AE3) may be a shelf management application or a shopping terminal. For example, in this step, the common service entity receives a subscription request for the shelf electronic label AE1 from AE3 (the shelf management application or the shopping terminal).

Next, the determining unit 1002 determines a second object associated with the first object.

For example, the second object (AE2) may be an inventory electronic label. For example, in this step, the determining unit 1002 may determine the inventory electronic label associated with the shelf electronic label.

For example, the determining unit 1002 may determine the second object associated with the first object by judging whether the first object and the second object are for the same object. For example, if the first object and the second object are for the same object, the determining unit 1002 can determine that the second object is associated with the first object; and if the first object and the second object are for different objects, the determining unit 1002 can determine that the second object is not associated with the first object.

In some implementations, the determining unit 1002 may also determine the second object associated with the first object based on an association rule included in the subscription request.

For example, the association rule may be included in the subscription request which is sent from the shopping terminal received by the receiving unit 1001. For example, the association rule may indicate that an object bound to a commodity with a same category as the commodity associated with the first object is served as the second object. Then, the common service entity may determine the second object associated with the first object according to the association rule.

After determining, by the determining unit 1002, the second object associated with the first object, next, the generating unit 1003 generates a subscription at least to the second object. Here, generating the subscription to the second object includes one of two methods: (1) creating a subscription resource for the second object; (2) creating subscription resources to the first object and the second object.

FIG. 3 is a flowchart of a method 200 for generating the subscription to the second object according to the embodiments of the present disclosure, and FIG. 4 is a flowchart of another method 200 for generating the subscription to the second object according to the embodiments of the present disclosure. In the following, the generating unit 1003 generates the subscription to the second object is described with reference to FIG. 3-FIG. 4.

FIG. 3 shows the flowchart of the method 200 for generating the subscription to the second object according to the embodiments of the present disclosure. As shown in FIG. 3, the subscription to the second object may be generated in the following manner including: determining a subscription mode for the second object based on a state of the second object (S201); and generating the subscription to the second object according to the determined subscription mode (S202).

For example, in a case where the second object is the virtual electronic label in a retail field, the state of the second object may be classified into two states of in-stock and out-of-stock. It should be realized that the state of the second object is not limited to this, and the state of second object may be classified into any appropriate state according to situations, and there is no limitation here. For example, the subscription mode may include a long-term subscription, a short-term subscription, an additional information subscription, a reservation information subscription, a high-priority subscription, a low-priority subscription, a high-frequency information subscription, and a low-frequency information subscription and so on. One or more of message priority, validity periods of the subscription resources, content of the notification, and the number of notification messages under different subscription modes are different. Different subscription modes may be selected for different situations (for example, the state of the second object), thereby improving the user experience. Next, different subscription modes will be described in detail.

For example, the subscription mode may be divided into the long-term subscription and the short-term subscription according to the validity period of a notification reserved for subscription resources. The validity period of the notification for the long-term subscription is longer than that of the short-term subscription. For example, in the case of the long-term subscription mode, a longer validity period of the notification (for example, one month) may be set, and a notification may be sent to the notified party when an event notification rule is satisfied within the validity period. However, for example, in the case of the short-term subscription mode, a shorter validity period of the notification (for example, real-time delivery) may be set, and a notification may be sent to the notified party when the event notification rule is satisfied within the validity period.

For example, the subscription mode may be divided into the additional information subscription and the reservation information subscription according to the content of the notification for the subscription resource. For example, in the case of the reservation information subscription mode, when an event notification rule is satisfied for certain commodity, detailed reservation information such as price, material, discount etc. related to the commodity and for an reservation information request may be sent to the notified party, where the reservation information request may be included in the subscription request. For example, in the case of the additional information subscription mode, when the event notification rule is satisfied for a certain commodity, in addition to the detailed reservation information such as price, material, discount etc. related to the commodity and for the reservation information request, additional detailed information such as price, material, discount, etc., related to a commodity that is similar to the commodity may also be sent to the notified party, where the additional detailed information is not included in the subscription request.

For example, the subscription mode may be divided into the high-priority subscription and the low-priority subscription according to a priority of the notification for the subscription resource. For example, compared to the low-priority subscription mode, in the case of the high-priority subscription mode, the notification may be sent first in time, or the notification may be sent multiple times to ensure that the notified party could receive the notification.

For example, the subscription mode may be divided into the high-frequency information subscription and the low-frequency information subscription according to the number of information of the notification for the subscription resource. For example, in the case of the high-frequency information subscription mode, a short minimum notification time interval (for example, 2 hours) may be set. When the event notification rule is satisfied, notifications are sent to the notified party, and a time interval between two consecutive notifications is not shorter than the minimum notification time interval. For example, in the case of the low-frequency information subscription mode, a long minimum notification time interval (for example, 24 hours) may be set. When the event notification rule is satisfied, notifications are sent to the notified party, and a time interval between two consecutive notifications is not shorter than the minimum notification time interval.

Continue to refer to FIG. 3, for example, in step S201, a subscription mode for the second object may be determined for the state of the second object (for example, the state of in-stock or out-of-stock).

In one example, for a certain commodity, when the inventory is out-of-stock, the long-term subscription (for example, the validity period of the notification may be set to one month, and when the event notification rule is satisfied within the validity period, notifications may be sent to the notified party) may be selected, and when the inventory is in-stock, the short-term subscription (for example, when the event notification rule is satisfied, notification messages may be sent to the notified party in time) may be selected.

In another example, for a certain commodity, in a case where the inventory is in-stock, the reservation information subscription (for example, when the event notification rule is satisfied, detailed reservation information such as price, material, discount etc. related to the commodity and for the reservation information request may be sent to the notified party) may be selected; and in a case where the inventory is out-of-stock, the additional information subscription (for example, in addition to detailed reservation information such as price, material, discount etc. related to the commodity and for the reservation information request, additional detailed information such as price, material, discount, etc., related to a commodity that is similar to the commodity may also be sent to the notified party) may be selected.

Similarly, one or more of the high-priority subscription, the low-priority subscription, the high-frequency information subscription and the low-frequency information subscription may also be selected. It should be understood that the above subscription modes are just examples. For different situations, one of the long-term subscription, the short-term subscription, the additional information subscription, the reservation information subscription, the high priority subscription, the low priority subscription, the high-frequency information subscription, and the low-frequency information subscription, etc. may be selected, and other suitable subscription modes may also be selected, which is not repeated here.

After determining the subscription mode, next, in step S202, the generating unit 1003 generates a subscription to the second object according to the determined subscription mode.

FIG. 4 shows a flowchart of another method 300 for generating the subscription to the second object according to the embodiments of the present disclosure. As shown in FIG. 4, the subscription to the second object may be generated in the following manner including: determining the subscription mode for the first object and the second object based on the state of the second object (S301); and generating the subscription to the first object and the second object according to the determined subscription mode (S302). The selection of the subscription mode described in FIG. 4 is similar to the selection of the subscription mode described in FIG. 3 above, and will not be repeated here.

After the generating unit 1003 generates the subscription to the second object, the sending unit 1004 sends a subscription response, where the subscription response is used to indicate the result of the subscription. For example, the subscription response may be sent to the third entity, or the subscription response may be sent to other entities, where the subscription response is used to indicate the result of the generated subscription.

For example, in the case of creating the subscription resource for the second object, the subscription response is used to indicate the result of creating the subscription resource for the second object. In some implementations, in the case of creating the subscription resources for the first object and the second object, the subscription response is used to indicate the result of creating the subscription resources for the first object and the second object.

After completing the creation of the subscription, next, the event notification is sent to the notified party based on the determined subscription mode in response to that the event notification rule is satisfied, where the event notification rule is included in the subscription request.

Here, the subscription request may include a plurality of notified parties for receiving event notifications related to the subscription request. When the event notification rule of the subscriber is satisfied, the common service entity will send the event notification to all notified parties included in the subscription request. For example, when a manhole cover is moved, a manhole cover movement sensor will sense this change and send update data to the common service entity. The common service entity may determine whether the event notification rule is satisfied based on the update data of the manhole cover movement sensor. For example, when the subscription condition is the movement of the manhole cover, at this time, the common service entity determines that the event notification rule is satisfied, and sends the event notification to all notified parties included in the subscription request for subscribing to the event notification of the movement of the manhole cover, that is, notifies all the notified parties that the manhole cover was moved.

Figure 10:
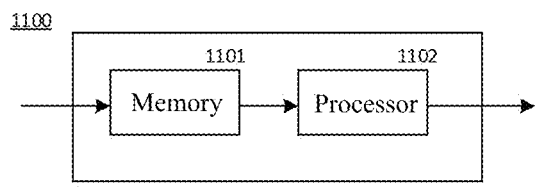
FIG. 10 is a schematic diagram of a device for subscribing to a resource according to embodiments of the present disclosure.

Hereinafter, a device 1100 for subscribing to a resource according to the embodiments of the present disclosure will be described with reference to FIG. 10. FIG. 10 is a schematic diagram of the device 1100 for subscribing to the resource according to the embodiments of the present disclosure. Since functions of the device for subscribing to the resource of the present embodiments is similar to the details of the method described above with reference to FIG. 1, detailed description of the same content is omitted here for the sake of simplicity.

As shown in FIG. 10, the device 1100 for subscribing to the resource includes a memory 1101 and a processor 1102. It should be noted that although the device 1100 for subscribing to the resource is shown as including only two devices in FIG. 10, this is only illustrative, and the device 1100 for subscribing to the resource may also include one or more other devices, which have nothing to do with the inventive concept and are omitted here.

The device for subscribing to the resource of the present disclosure includes: a memory 1101, which is configured to store computer-readable instructions; and a processor 1102, which is configured to execute the computer-readable instructions stored in the memory, where following steps are performed when the processor executes the computer-readable instructions: receiving, by a service entity, a subscription request for a first object from a third entity; determining a second object associated with the first object; generating a subscription at least to the second object; and sending a subscription response, in which the subscription response is used to indicate a result of the subscription.

Figure 11:
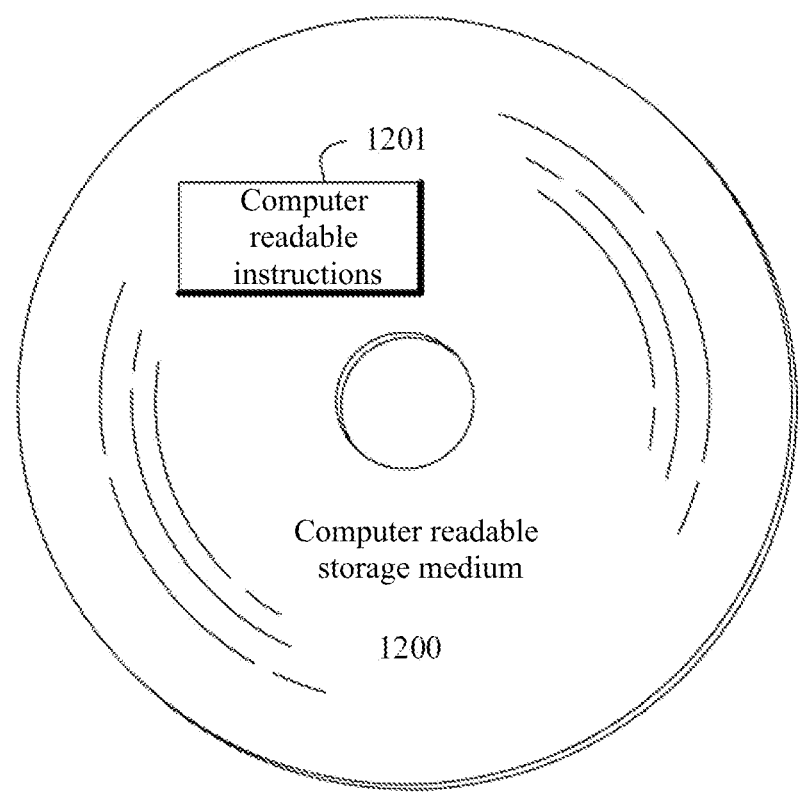
FIG. 11 is a schematic diagram of a computer-readable storage medium according to embodiments of the present disclosure.

FIG. 11 is a schematic diagram of a computer-readable storage medium according to the embodiments of the present disclosure.

As shown in FIG. 11, the present disclosure also includes a computer-readable storage medium with computer-readable instructions stored thereon which, when performed by a computer, cause the computer to perform a method for subscribing to a resource in IoT, the method comprising: receiving, by a service entity, a subscription request for a first object from a third entity; determining a second object associated with the first object; generating a subscription at least to the second object; and sending a subscription response, where the subscription response is used to indicate the result of the generation of the subscription.

Those skilled in the art may understand that various aspects of this application may be illustrated and described through a number of patentable categories or situations, including a combination of any new and useful process, machine, product, or substances, or any new and useful improvements to them. Correspondingly, various aspects of the present application may be completely executed by hardware, may be completely executed by software (including firmware, resident software, microcode, etc.), or may be executed by a combination of hardware and software. The above hardware or software may be called "data block", "module", "engine", "unit", "component" or "system". In addition, various aspects of this application may be embodied as a computer product located in one or more computer-readable medium, and the product includes computer-readable program codes.

This application uses specific words to describe the embodiments of this application. For example, "one embodiment", "an embodiment", and/or "some embodiments" intend to indicate a certain feature, structure, or characteristic related to at least one embodiment of the present application. Therefore, it should be emphasized and noted that the "one embodiment" or "an embodiment" or "an alternative embodiment" mentioned twice or more in different positions in this specification does not necessarily refer to the same embodiment. In addition, some features, structures, or characteristics in one or more embodiments of the present application may be combined appropriately.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly defined herein.

The above is an explanation of the present disclosure and should not be construed as a limitation to it. Although some exemplary embodiments of the present disclosure have been described, a skilled in the art may easily understand that many modifications may be made to these exemplary embodiments without departing from the creative teaching and advantages of the present disclosure. Therefore, all such modifications are intended to be included within the scope of the present disclosure as defined by the appended claims. It should be understood that the above is an explanation of the present disclosure and should not be considered as being limited to the specific embodiments disclosed, and modifications to the disclosed embodiments and other embodiments are intended to be included in the scope of the appended claims. The present disclosure is defined by the claims and their equivalents.

What is claimed is:

1. A method for subscribing to a resource in a field of Internet of Things, comprising:
   receiving, by a service entity, from a third entity, a subscription request for creating a subscription resource for a first object;
   determining, by the service entity, a second object which is associated with, but different from the first object;
   generating, by the service entity, a subscription resource for the second object and another subscription resource for the first object; and
   sending, by the service entity, to the third entity, a subscription response, wherein the subscription response is used to indicate a result of creating the subscription resource for the second object and the subscription resource for the first object.

2. The method of claim 1, wherein,
   the generating the subscription resource for the second object comprises:
   creating the subscription resource for the second object.

3. The method of claim 1, wherein, the generating the subscription resource for the second object and the subscription resource for the first object comprises: creating the subscription resource for the second object and the subscription resource for the first.

4. The method of claim 1, wherein the generating the subscription resource for the second object comprises:
   determining a subscription mode for the second object based on a state of the second object; and
   generating the subscription resource for the second object according to the determined subscription mode.

5. The method of claim 4, wherein,
   the subscription mode comprises one or more of a long-term subscription, a short-term subscription, an additional information subscription, a reservation information subscription, a high-priority subscription, a low-priority subscription, a high-frequency information subscription, and a low-frequency information subscription.

6. The method of claim 1, wherein the generating the subscription resources for the first object and the second object comprises:
   determining a subscription mode for the first object and the second object based on a state of the second object; and
   generating the subscription resource for the second object and the subscription resource for the first object according to the determined subscription mode.

7. The method of claim 1, wherein the determining the second object associated with the first object comprises:
   determining whether the first object and the second object are for a same object,
   determining that the second object is associated with the first object in response to that the first object and the second object are for the same object.

8. The method of claim 1, wherein the determining the second object associated with the first object comprises:
   determining whether the first object and the second object belong to a same group; or
   determining whether an association attribute of the first object comprises the second object; or
   determining whether an association attribute of the second object comprises the first object.

9. The method of claim 1, wherein the determining the second object associated with the first object comprises:
   determining the second object associated with the first object based on an association rule comprised in the subscription request.

10. The method of claim 9, wherein,
    the association rule indicates that an object bound to a commodity with a same category as a commodity associated with the first object is served as the second object.

11. An apparatus for subscribing to a resource in Internet of Things, comprising:
    a receiving unit, configured to enable a service entity to receive, from a third entity, a subscription request for creating a subscription resource for a first object;
    a determining unit, configured to determine a second object which is associated with, but different from the first object;
    a generating unit, configured to generate a subscription resource for the second object and another subscription resource for the first object; and
    a sending unit, configured to send a subscription response, to the third entity, wherein the subscription response is used to indicate a result of creating the subscription resource for the second object and the subscription resource for the first object.

12. The apparatus of claim 11, wherein,
    the generating unit determines a subscription mode for the second object based on a state of the second object; and
    generates the subscription to the second object according to the determined subscription mode.

13. The apparatus of claim 11, wherein, the generating unit determines a subscription mode for the first object and the second object based on a state of the second object; and generates the subscription resource for the second object and the subscription resource for the first object according to the determined subscription mode.

14. The apparatus of claim 11, wherein,
    the generating unit determines whether the first object and the second object are for a same object, and
    determines that the second object is associated with the first object in response to that the first object and the second object are for the same object.

15. The apparatus of claim 11, wherein,
    the generating unit determines whether the first object and the second object belong to a same group; or
    determines whether an association attribute of the first object comprises the second object; or
    determines whether an association attribute of the second object comprises the first object.

16. The apparatus of claim 11, wherein,
    the generating unit determines the second object associated with the first object based on an association rule comprised in the subscription request.

17. The apparatus of claim 16, wherein,
    the association rule indicates that an object bound to a commodity with a same category as a commodity associated with the first object is served as the second object.

18. A computer-readable storage medium storing computer-readable instructions thereon, which, when performed by a computer, cause the computer to perform a method for subscribing to a resource in Internet of Things, the method comprising:
- receiving, by a service entity, from a third entity, a subscription request for creating a subscription resource for a first object from a third entity;
- determining a second object associated with the first object, but different from the first object;
- generating a subscription resource for the second object and another subscription resource for the first object; and
- sending a subscription response, wherein the subscription response is used to indicate a result of creating the subscription resource for the second object and the subscription resource for the first object.

* * * * *